United States Patent [19]

Richter et al.

[11] Patent Number: 4,840,047
[45] Date of Patent: Jun. 20, 1989

[54] MULTISCREEN PRESSURE DIFFUSER

[75] Inventors: Johan C. F. C. Richter, Oslo, Norway; Ole J. Richter, Karlstad, Sweden

[73] Assignee: Kamyr AB, Karlstad, Sweden

[21] Appl. No.: 195,670

[22] Filed: May 18, 1988

Related U.S. Application Data

[63] Continuation-in-part of Ser. No. 125,710, Nov. 27, 1987.

[51] Int. Cl.$^4$ ............................................... D21C 9/00
[52] U.S. Cl. ..................................... 68/181 R; 8/156; 162/60; 162/251; 210/411; 366/196
[58] Field of Search ............... 68/181 R, 184, 190, 68/18 F; 8/156; 162/57, 60, 251, 252, 243, 380; 210/333.01, 333.1, 393, 411, 159, 203, 108, 785; 366/195, 196; 92/117, 117 A

[56] References Cited

U.S. PATENT DOCUMENTS

| | | | |
|---|---|---|---|
| 1,601,091 | 9/1926 | Wayland | 68/190 |
| 1,605,412 | 11/1926 | Williams | 68/190 |
| 1,857,026 | 5/1932 | Ligon | 92/117 R X |
| 3,445,002 | 5/1969 | Muller | 210/333.01 X |
| 3,579,420 | 5/1971 | Richter | 162/237 |
| 3,704,603 | 12/1972 | Richter | 68/18 F |
| 3,729,961 | 5/1973 | Leffler | 68/181 R |
| 3,760,948 | 9/1973 | Johansen | 210/342 |
| 4,172,037 | 10/1979 | Golston | 210/315 |
| 4,468,319 | 8/1984 | Laakso | 210/333.01 X |
| 4,529,482 | 7/1985 | Richter et al. | 68/181 R X |
| 4,556,494 | 12/1985 | Richter et al. | 210/785 |

FOREIGN PATENT DOCUMENTS 494680 5/1954 Italy ............................................... 68/190

OTHER PUBLICATIONS

Kamyr Bulletin No. 400 DR "Kamyr Diffusion Washers", List of Installations and Applications as of Dec. 31, 1974.
Kamyr Bulletin No. 600 "For New Bleach Plants, Bleach Plant Stage Additions, New Brown Stock Washing Systems, Brown Stock Washing Improvements", no date.

Primary Examiner—Harvey C. Hornsby
Assistant Examiner—Stephen F. Gerrity
Attorney, Agent, or Firm—Nixon & Vanderhye

[57] ABSTRACT

A pressure diffuser for paper pulp includes a vertical pressurizable liquid-tight vessel having a pulp inlet at the bottom and a pulp outlet at the top. One or more ring shaped screen elements providing first and second concentric screen surfaces, are vertically mounted within the vessel. A number of radially extending header arms mount the screen elements for movement in the vessel and in fluid communication with it. A first linear actuator effects reciprocation of the arms. A cylinder, open at both ends, is affixed to the arms and extends both above and below them, and a piston is disposed within the cylinder, below the arms. A second linear actuator is operatively connected to the piston to effect reciprocation of the piston in the cylinder. A guiding conduit surrounds the open end of the cylinder above the arms and guides reciprocation of the cylinder and transports liquid from the arms to an effluent outlet. A perforated jacket surrounding the guiding conduit, nozzles at the vessel wall, and the like introduce liquid into the vessel for treatment of the pulp. The ring shaped screen element is connected to the arms in a manner to allow the best liquid communication between them. In this way pulp can be effectively treated in a pressurized vessel while the screens for treating the pulp are periodically backflushed without causing a surge within the vessel.

19 Claims, 4 Drawing Sheets

MULTISCREEN PRESSURE DIFFUSER

CROSS REFERENCE TO RELATED APPLICATION

This application is a continuation-in-part of application Ser. No 125,710 filed Nov. 27, 1987 (now U.S. Pat. 4,793,161), the disclosure of which is incorporated by reference herein.

BACKGROUND AND SUMMARY OF THE INVENTION

The parent application shows backflushing in diffuser/thickener screen assemblies which is useful in a wide variety of vessels. The present invention relates to a specific improvement primarily for pressure diffusers.

Conventional pressure diffusers have a number of significant operating drawbacks. Because of the inlet geometry, the utilization of straight screens, and other design elements which are dictated by the pressurized environment, conventional pressure diffusers have a tendency to plug, shutting down completely and sometimes also disrupting other treatment vessels that are connected to it.

According to the present invention, a multiscreen pressure diffuser is provided which is much less likely to plug than conventional pressure diffusers. The multiscreen pressure diffuser according to the invention has design elements similar to conventional unpressurized diffusers, such as illustrated in the parent application drawings, while operating under pressurized conditions. The extraction liquid, treating liquid, and pulp flows are such that the screens are periodically backflushed without causing a surge in the vessel, and allow for smooth transport of the various elements to the desired areas. There are very few projections upon which the pulp can "hand up", and for any such projections liquid injection means are provided for injecting additional amounts of liquid so that the pulp at such points becomes more fluid and will not hang up.

According to one aspect of the present invention, a pressure diffuser comprises a generally vertical pressurizable liquid-tight vessel having a slurry inlet (preferably adjacent the bottom) and a slurry outlet (preferably adjacent the top). At least one ring-shaped screen element, providing first and second concentric screen surfaces, is mounted generally vertically within the vessel. A plurality of radially extending header arms mount the screen element for movement in the vessel and are in fluid communication therewith. A first linear actuator means is mounted in vertical alignment with the vessel, and is operatively connected to the arms for effecting reciprocation thereof. A cylinder, open at both ends, is affixed to the arms and extends above and below them to define a generally vertical pathway. A piston is disposed within the cylinder generally below the arms for reciprocation therewithin. A second linear actuator is disposed in vertical alignment with the vessel and means are provided for operatively connecting the piston to the second actuator to effect reciprocation of the piston and the cylinder. A guiding conduit surrounds an open end of the cylinder above the arms, for guiding reciprocation of the cylinder with the arms and for transporting liquid from the arms. An effluent outlet is connected to the guiding conduit for carrying liquid effluent from the guiding conduit to a location remote from the vessel. Treatment liquid is introduced into the vessel from a perforated jacket surrounding the guiding conduit, and from nozzles at the vessel walls. A second actuator is located above the arms and the connecting means comprises a plurality of rods arcuately spaced from each other and from the arms and extending above the arms to below the arms. Liquid injecting means are provided for injecting liquid beneath any stationary obstructions within the vessel to prevent slurry particles from collecting thereat.

The invention is primarily useful for the treatment of comminuted cellulosic fibrous material slurries (paper pulp). According to the method of the present invention, utilizing the pressure diffuser of the invention, the following steps are practiced: (a) Pressurizing the vessel. (b) Feeding slurry into the vessel under pressure to cause it to move past the screen surfaces and effluent liquid from the slurry to pass through the screen surfaces to flow to the header arms and to be discharged therefrom. (c) Removing the effluent liquid from the vessel. (d) Reciprocating the arms, with screen element, up and down. And, (e) periodically effecting back flushing of the screen surfaces without causing a surge within the vessel. There typically would be the further step of introducing treatment liquid into the vessel to pass through the slurry and displace at least some effluent liquid. Also the slurry is agitated, preferably at the top of the vessel, to facilitate smooth passage of the slurry particles out of the vessel after treatment.

In the pressure diffuser according to the invention it is desirable to provide the ring-shaped screen element with a pair of radially spaced ring-shaped plates disposed between the screen surfaces thereof and concentric therewith. Means are provided defining a plurality of pressure difference holes spaced along the length of the plates, and a solid wall portion of the ring-shaped element connects to the arms, such portion having a solid top wall with means defining a plurality of bores therewithin, with the bores disposed between the plates. While such a construction is particularly useful for a pressure diffuser, it may also be applied to other conventional diffusers that are not pressurized.

According to another aspect of the present invention a pulp treating apparatus in general is provided. That apparatus comprises: A generally vertical vessel having vertically spaced pulp inlet and outlet. A plurality of radially extending header arms for conducting fluid. First linear actuator means mounted in vertical alignment with the vessel and operatively connected to the arms for effecting reciprocation thereof. A cylinder, open at both ends, affixed to the arms and extending both above and below the arms to define a generally vertical pathway. A piston disposed within the cylinder generally below the arms for reciprocation therewithin. Second linear actuator means disposed in vertical alignment with the vessel and operatively connected to the piston to effect reciprocation of the piston in the cylinder. A guiding conduit surrounding an open end of the cylinder generally above the arms, for guiding reciprocation of the cylinder with the arms and for transporting liquid from the arms, and an effluent outlet connected to the guiding conduit for carrying effluent liquid from the guiding conduit to a location remote from the vessel.

It is the primary object of the present invention to provide for the effective treatment of slurries, such as comminuted cellulosic fibrous material slurries, and most desirably under pressurized conditions. This and other objects of the invention will become clear from an

DETAILED DESCRIPTION OF THE DRAWINGS

Figure 1:
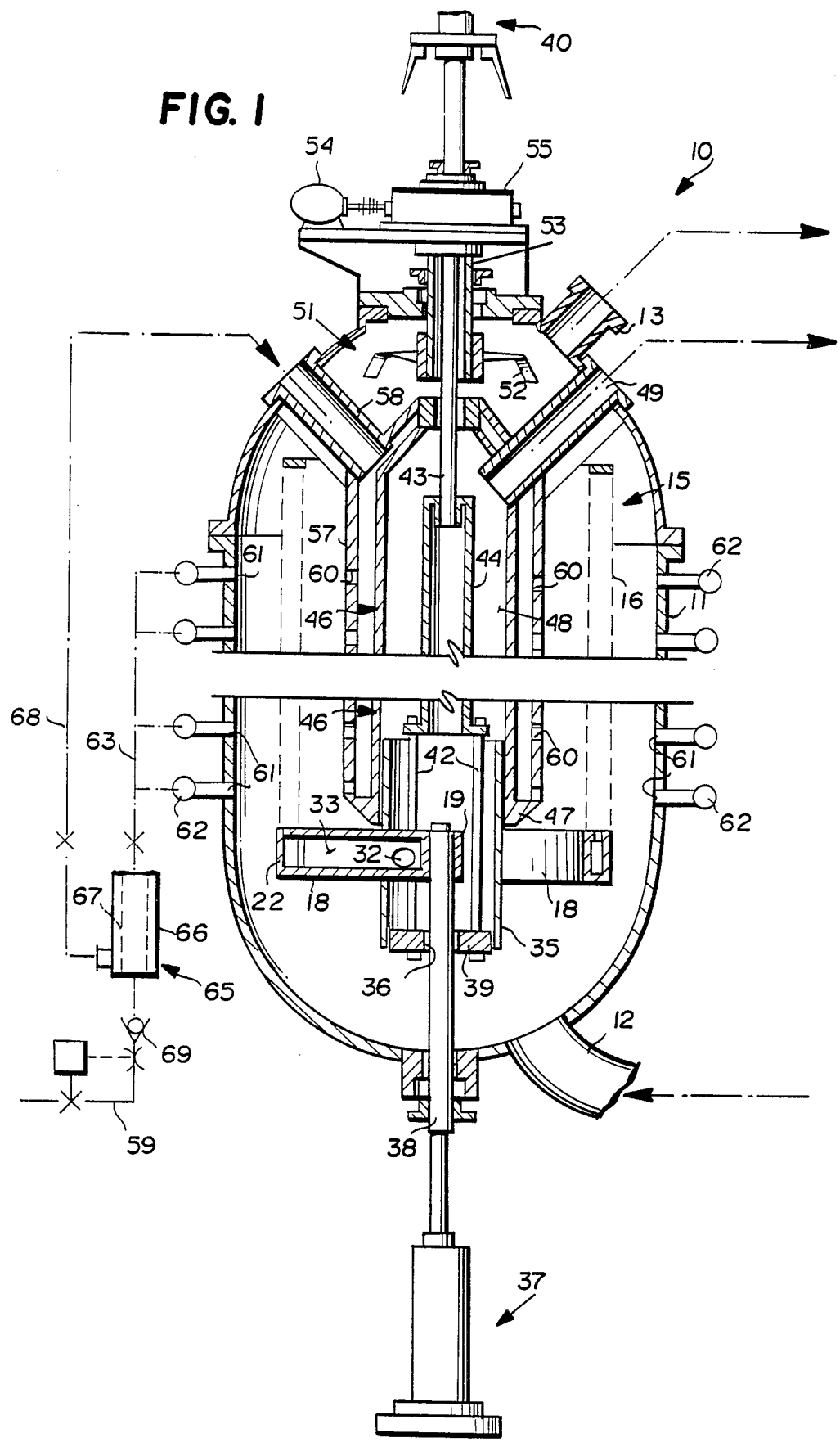
FIG. 1 is a side schematic side view of an exemplary pressure diffuser according to the present invention, mostly in cross-section but partly in elevation.

An exemplary pressure diffuser 10 according to the present invention is illustrated in FIG. 1 through 5. The pressure diffuser comprises a generally vertical pressurizable liquid-tight vessel 11 having a slurry inlet 12 preferably adjacent the bottom thereof, and a slurry outlet 13 preferably adjacent the top. The vessel is pressurized to a conventional pressure for such vessels, significantly greater than one atmosphere. At least one ring-shaped screen element 15 is provided having first and second concentric screen surfaces 16, mounted generally vertically within the vessel 11. A plurality of radially extending header arms 18 (e.g. three) mount the screen element 15 for movement in the vessel, with the arms 18 and screen element 15 in fluid communication. The arms 18 are connected to hub 19.

Figure 2:
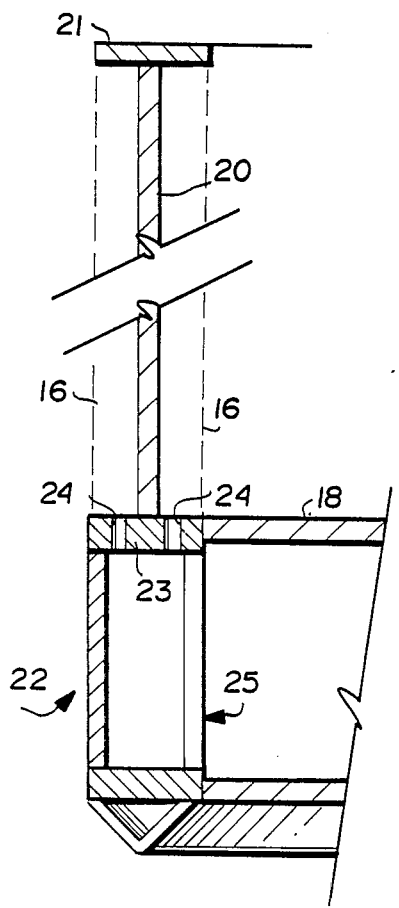
FIG. 2 is a detail cross-sectional view showing one embodiment of the connection of the screen to the header arms for the apparatus of FIG. 1.
Figure 3:
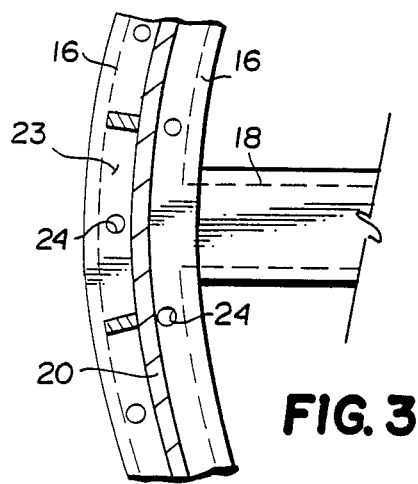
FIG. 3 is a vertical cross-section of the apparatus of FIG. 2.

One form of connection of the screen element to the arms 18 is shown in FIGS. 2 and 3. In this embodiment, a central ring-shaped solid wall 20 is provided between the screen surfaces 16, with a top solid ring 21 defining the upper portion of the element 15. At the bottom, the wall 20 is welded or otherwise attached to a ring 23 which is connected to the arm 18. The ring 23 includes a plurality of spaced holes 24 therewithin, and is connected to an extension 22 of the arm 18. An opening 25 provides for fluid communication between the arm 18 and the interiors of the screen surfaces 16, through openings 24. Such an arrangement is basically conventional for non-pressurized diffusers.

Figure 4:
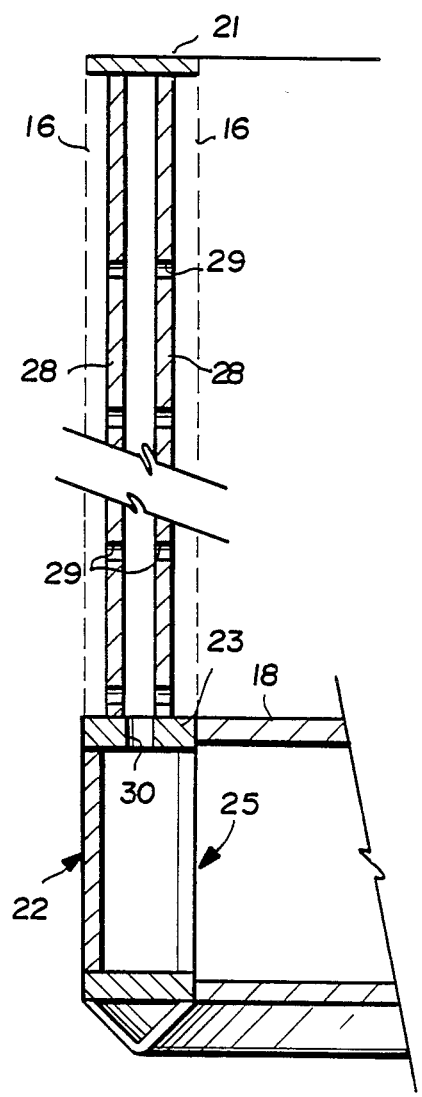
FIG. 4 is a view like that of FIG. 2 showing a second embodiment of the connection between the screen elements and header arms.
Figure 5:
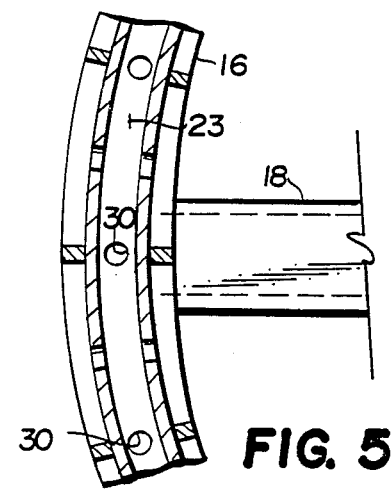
FIG. 5 is a view like that of FIG. 3, for the apparatus embodiment of FIG. 4.

The FIGS. 4 and 5 illustrate another manner in which the screen element 15 may be connected to an arm 18, that is not conventional, and—although particularly adapted for the pressure diffuser 10—may also be used for other non-pressurized diffusers. In this embodiment elements comparable to those in the FIG. 2 embodiment have the same reference numerals.

In the embodiment of FIGS. 4 and 5, instead of a single interior wall, a pair of interior tubular elements 28 are provided, each having a plurality of pressure difference holes 29 spaced along the length thereof. A solid ring 23 connected to the extending portion 22 of the arm 18 has a plurality of bores 30 therein, between the tubular walls 28. The embodiment of FIGS. 4 and 5 results in a more even and effective flow, both during the screening and for backflushing, under most circumstances.

With reference to FIG. 1, the arms 18 have interior passageways 33 in fluid communication with the openings 25 and screen elements 15, with means defining openings 32 therein providing for the exit of liquid from the interior cavity 33 to be removed from the vessel, as will be hereinafter described.

The apparatus 10 further comprises a cylinder 35, open at both ends, affixed to the arms 18 and extending above and below them to define a generally vertical pathway. The cylinder 35 is welded or otherwise attached to the arms 18. This may be accomplished by providing the cylinder 35 in three sectors which are attached, and then welded together, and to the arms 18. A first linear actuator means 37, such as a hydraulic cylinder, is mounted in vertical alignment with the vessel 10 and is operatively connected to the arms 18 at hub 19 thereof via rod 38. The rod 38 passes through a through-extending opening in a piston 39 which is disposed within the cylinder 35 generally below the arms 18 for reciprocation within the cylinder 35.

A second linear actuator means 40, such as a hydraulic cylinder, is also provided in vertical alignment with the vessel 10. Means are operatively provided for connecting the piston 39 to the second actuator means 40 to effect reciprocation of the piston 39 within the cylinder 35. Such connecting means comprises a plurality (e.g. three) of rods 42 arcuately spaced from each other and from said arms 18 and extending from above the arms to below the arms, having an effective length substantially as great as the length of the cylinder 35. The connecting means further includes the rod 43 directly connected to the second linear actuator 40, and rigidly connected to tube 44. The element 44 is tubular only to make it stiffer if lone, and it could be a solid rod extending all the way from the top (i.e. from second actuator 40) if descried. tube 44 is rigidly connected at one end thereof to the rod 43, and rigidly connected (e.g. by nuts engaging screw threaded ends of the rods 42) to the rods 42 at the other end thereof. Note that the piston 39 has some clearance within the cylinder 35 so that leakage is provided, there being no reason to provide a completely fluid tight engagement between the piston 39 and the cylinder 35, or the rod 38.

The pressure diffuser 10 further comprises a guiding conduit 46 surrounding the open top end of the cylinder 35 generally above the arms 18, for guiding reciprocation of the cylinder 35 with the arms 18, and for transporting liquid from the arms 18. The guiding conduit 46 defines an interior volume 48, which is connected to an effluent liquid outlet 49 for carrying effluent liquid from the guiding conduit 46 interior volume 48 to a location remote from the vessel 11.

Mounted adjacent the top of the vessel 11, near the pulp outlet 13, is an agitator means 51, including plurality of downwardly sloping blade portions 52. The agitator means 51 is for agitating the pulp slurry adjacent the top of the vessel 11 to keep it moving freely and out the outlet 13. The blades 52 are rotated by hollow shaft 53, which in turn is rotated by a motor 54 or the like mounted atop the vessel 11, and connected by gear means (shown schematically at 55) to the shaft 53.

The apparatus as just described is useful for thickening of a pulp slurry. However, in most circumstances, rather than merely thickening the pulp slurry it will be desirable to treat the slurry with a treatment liquid (e.g. a washing or bleaching liquid). Thus means are provided for introducing treatment liquid into the vessel 11 for treatment of the pulp slurry passing therethrough. Such liquid introducing means preferably includes a perforated jacket 57 surrounding the guiding conduit 46 and connected via a pipe 58 to a conduit 59 which supplies treatment liquid to the jacket 57. The perforations (holes) 60 provided in the jacket 57 are spaced substantially uniformly thereover th evenly introduce treatment liquid to displace liquid contained in the slurry.

The liquid introducing means also further comprise a plurality of nozzles 61 disposed around the sidewall of the vessel 11 to uniformly introduce treatment liquid inwardly from the sidewall. The nozzles 61 are connected to headers 62, which in turn are ultimately connected, via conduit 63, to conduit 59. Note that the conduit 49 and the pipe 58 support the jacket 57, and via the jacket 57 and the conduit 46, so that the conduit 46 and jacket 57 are stationarily mounted within the vessel 11.

The supply of treatment liquid from conduit 59 preferably passes through an in-line strainer 65 having a solid exterior wall 66 and a perforated interior tubular strainer 67. The conduit 63, supplying treatment liquid to the nozzle 61, and the conduit 68, providing treatment liquid to the pipe 58, are both connected to the volume between the perforated tube 67 and the exterior solid wall 66. A check valve 69 is also provided connected between the conduit 59 and the strainer 65. In this way, should pulp stock back up into the nozzles or the perforated jacket, it will not contaminate the conduit 59, but rather will be strained out by the perforated tube 67.

Figure 6:
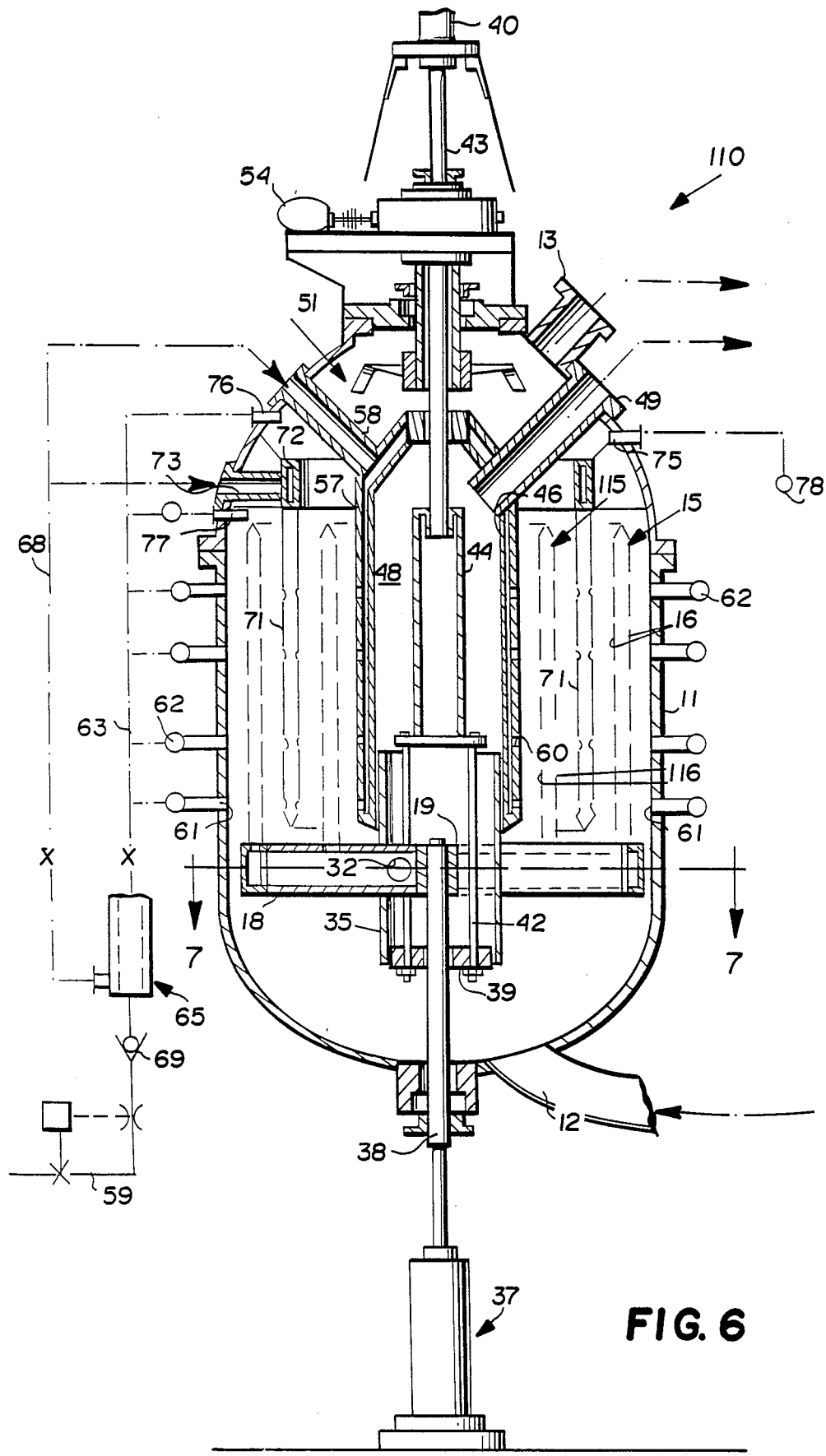
FIG. 6 is a view like that of FIG. 1 for a second embodiment of pressure diffuser according to the invention.
Figure 7:
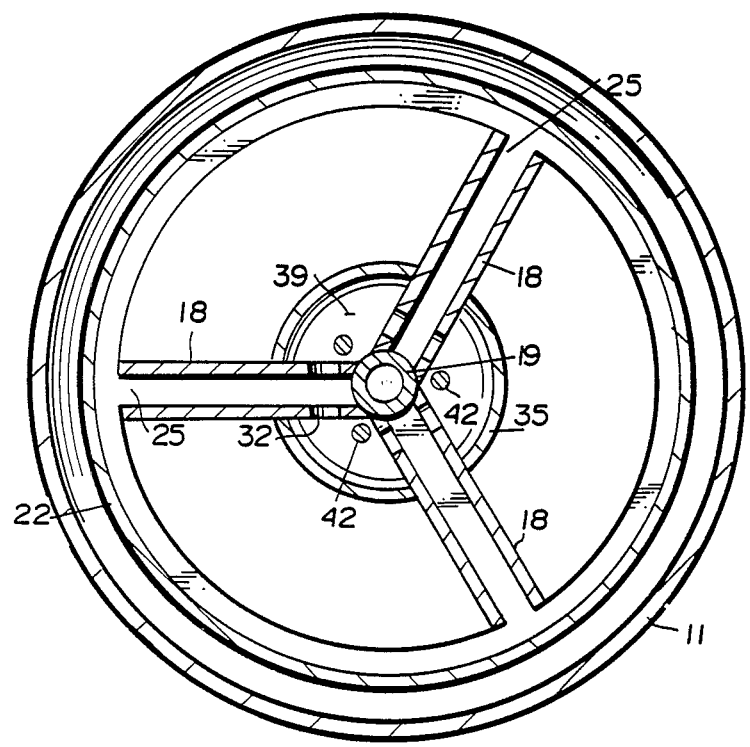
FIG. 7 is a cross-sectional view taken along lines 7—7 of FIG. 6.

FIGS. 6 and 7 illustrate another embodiment of an exemplary pressure diffuser according to the invention. This embodiment differs from the embodiment of FIG. 1 primarily in its diameter, and structures comparable to those in the FIG. 1 embodiment are illustrated by the same reference numeral. In this embodiment, a plurality of ring-shaped screen elements (e.g. two) 15, 115 are provided. Each ring-shaped screen element has a pair of concentric screen surfaces 16, 116. In order to provide for the introduction of treatment liquid in an appropriate manner in order to uniformly treat the pulp stock flowing through the vessel 11, there is provided a tubular ring 71, disposed between the screen elements 15, 115, which introduces liquid both radially outwardly and inwardly through holes in its walls. The hollow ring 71 is stationarily mounted to a header 72 located above the screen elements 15, 115, the header 72 connected by a pipe 73 to the conduit 68 for supplying treatment liquid to ring 71.

The embodiment illustrated in FIGS. 6 and 7 further distinquishes from that of FIG. 1 in the provision of liquid injecting means for injecting liquid beneath any stationary obstructions within the vessel 11 to prevent slurry particles from collecting thereat. For example, the conduit 49 and the pipes 58, 73 present stationary obstructions to the flow of the slurry from the inlet 12 to the outlet 13. Nozzles 75, 76, 77, respectively, are disposed beneath these obstructions 49, 58, 73. The nozzles 75, 77 are connected to a common header 78 and ultimately to the conduit 63, while the nozzle 76 is directly connected to the conduit 63. Treatment liquid is thus continuously (or where appropriate valving and timers are provided, periodically) introduced into the vessel beneath the stationary obstructions to keep the slurry flowing around the obstructions so that "hang-up" of the pulp does not occur.

Utilizing the pressure diffuser 110 of FIGS. 6 and 7, a method of treating a comminuted cellulosic fibrous material slurry having a wide variety of consistencies (e.g. 2-15%, preferably 8-12%) is provided. The liquid-tight vessel 11 is pressurized to a conventional pressure for a pressure diffuser (significantly greater than one atmosphere), and slurry is fed under pressure into the inlet 12 to cause it to move upwardly and ultimately pass out the outlet 13. Effluent liquid is removed as it passes through screen surfaces 16, 116 is conducted to arms 18, and ultimately passes through openings 32 in the arms 18 to the interior chamber 48 of the conduit 46. The effluent liquid is discharged from outlet 49. Treatment liquid is continuously introduced from conduit 59 through nozzle 61, through the perforations 60 in jacket 57, and through stationary tubes 71.

The main actuator 37, which preferably has a stroke of about 18 to 20 inches, reciprocates the arms 18 and connected screen elements 15, 115. The arms 18, with attached cylinder 35, are reciprocated upwardly (in the direction of pulp flow) slowly, and when the end of travel of the actuator 37 is reached, are controlled to be reciprocated downwardly quickly. At the time of quick downward movement, or just prior thereto, the second actuator 40 is actuated to move the piston 39 upwardly to displace the liquid in the cylinder 35 so that it back-flushes through the openings 32, and ultimately passes through the arms 18, backflushing the screen surfaces 16, 116. The stroke of the piston 39 typically would be about 20 to 30 inches. Since the piston 39 is disposed entirely within the vessel 11, the volume behind the piston will merely be filled with pulp stock, and there will be no surge in the vessel as a result of the screen cleaning backflushing action.

It is noted that although the piston 39 never moves above the arms 18 (it is prevented from doing so), the cylinder 35 extends above the arms 18 in order to provide a moving seal between the interior volume 48 and the pulp so that pulp does not flow into the volume 48.

It will thus be seen that according to the present invention a pressure diffuser, and the like pulp treating vessels, and a method of treating comminuted cellulosic fibrous material, have been provided which allow the effective pressure diffusion of slurries without significant chance of hang-up of the slurry of clogging of the screen surfaces. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and processes.

What is claimed is:

1. A pressure diffuser comprising:
 (a) a generally vertical pressurizable liquid tight vessel having a slurry inlet adjacent the bottom and a slurry outlet adjacent the top;
 (b) at least one ring shaped screen element, providing first and second concentric screen surfaces, mounted generally vertically within said vessel;
 (c) a plurality of radially extending header arms mounting said screen element for movement in said vessel, and in fluid communication therewith;

(d) first linear actuator means mounted in vertical alignment with said vessel and operatively connected to said arms for effecting reciprocation thereof;
(e) a cylinder, open at both ends, affixed to said arms and extending above and below them to define a generally vertical pathway;
(f) a piston disposed within said cylinder generally below said arms for reciprocation therewithin;
(g) second linear actuator means disposed in vertical alignment with said vessel;
(h) means for operatively connecting said piston to said second actuator to effect reciprocation of said piston in said cylinder;
(i) a guiding conduit surrounding an open end of said cylinder generally above said arms, for guiding reciprocation of said cylinder with said arms and for transporting liquid from said arms; and
(j) an effluent outlet connected to said guiding conduit for carrying effluent liquid from said guiding conduit to a location remote from said vessel.

2. A pressure diffuser as recited in claim 1 further comprising (k) means for introducing liquid into said vessel for treatment of the slurry passing therethrough.

3. A pressure diffuser as recited in claim 2 wherein said means (g) is located above said arms, and wherein said means (h) comprises a plurality of rods arcuately spaced from each other and from said arms, and extending from above said arms to below said arms.

4. A pressure diffuser as recited in claim 2 wherein said means (k) includes a perforated jacket around said means (i).

5. A pressure diffuser as recited in claim 2 wherein said means (k) include nozzles in the vessel sidewall.

6. A pressure diffuser as recited in claim 5 wherein at least 2 ring shaped screen elements are provided, each having a pair of screen surfaces, and wherein said means (k) includes a ring shaped header mounted between two of said screen elements, concentric therewith.

7. A pressure diffuser as recited in claim 2 further comprising (m) liquid injecting means for injecting liquid beneath any stationary obstructions within said vessel to prevent slurry particles from collecting thereat.

8. A pressure diffuser as recited in claim 7 further comprising (n) means for supplying treatment liquid to both said means (k) and said means (m), said means (n) including an in line strainer to prevent any slurry which backs up into it from passing into the means (m).

9. A pressure diffuser as recited in claim 1 further comprising agitator means mounted adjacent the top of said vessel for agitating slurry therewithin to facilitate its free flow out the slurry outlet.

10. A pressure diffuser as recited in claim 9 wherein said means (g) is disposed above said vessel and further comprising a drive for said agitator means mounted above said vessel.

11. A pressure diffuser as recited in claim 10 wherein said agitator means comprises an agitator blade and a hollow shaft for rotating said blade, said hollow shaft extending from the top of the vessel into the vessel; and wherein said means (h) includes a main rod extending from said means (g) through said vessel, interiorly of and concentric with said hollow shaft.

12. A pressure diffuser as recited in claim 11 wherein said main rod is hollow along at least a portion of the length thereof so that it is relatively stiff.

13. A pressure diffuser as recited in claim 1 wherein said ring shaped screen element includes a pair of radially spaced ring shaped plates disposed between the screen surfaces thereof and concentric therewith, and means defining a plurality of pressure difference holes spaced along the length of said plates; and further comprising a solid walled portion of said ring shaped element for connection to said arms, said portion having a solid top wall with means defining a plurality of bores therewithin, said bores disposed between said plates.

14. A pulp treating apparatus comprising:
(a) a generally vertical vessel having a slurry inlet and a slurry outlet spaced vertically therealong;
(b) at least one ring shaped screen element, providing first and second concentric screen surfaces, mounted generally vertically within said vessel;
(c) a plurality of radially extending header arms mounting said screen element for movement in said vessel, and in fluid communication therewith;
(d) first actuator means mounted in vertical alignment with said vessel and operatively connected to said arms for effecting reciprocation thereof;
(e) a chamber defining element having first and second ends, which ends are open, and affixed to said arms and extending both above and below said arms;
(f) a liquid engaging element mounted within said chamber defining element for relative movement therewithin;
(g) second actuator means for effecting relative movement between said chamber defining element and said liquid engaging element;
(h) a guiding conduit surrounding an open end of said chamber on one side of said arms, for guiding movement of said chamber with said arms and for transporting liquid from said arms; and
(i) an effluent outlet connected to said guiding conduit for carrying effluent liquid from said guiding conduit to a location remote from said vessel.

15. A apparatus as recited in claim 14 further comprising (j) means for introducing liquid into said vessel for treatment of the pulp passing therethrough.

16. Apparatus as recited in claim 15 wherein said means (j) includes a perforated jacket surrounding said means (h), and nozzles adjacent the sidewall of said vessel.

17. Pulp treating apparatus comprising:
a generally vertical vessel having a slurry inlet and a slurry outlet vertically spaced from each other;
at least one ring shaped screen element, providing first and second concentric screen surfaces, mounted generally vertically within said vessel; and
a plurality of radially extending header arms mounting said screen element for movement in said vessel, and in fluid communication therewith;
said ring shaped screen element including a pair of radially spaced ring shaped plates disposed between the screen surfaces thereof and concentric therewith, and means defining a plurality of pressure difference holes spaced along the length of said plates; and further comprising a solid wall portion of said ring shaped element for connection to said arms, said portion having a solid top wall with means defining a plurality of bores therewithin, said bores disposed between said plates.

18. A pulp treating apparatus comprising:

a generally vertical vessel having vertically spaced pulp inlet and outlet;

a plurality of radially extending header arms for conducting fluid;

first linear actuator means mounted in vertical alignment with the vessel and operatively connected to the arms for effecting reciprocation thereof;

a cylinder, open at both ends, affixed to said arms and extending both above and below said arms to define a generally vertical pathway;

a piston disposed within said cylinder generally below said arms for reciprocation therewithin;

second linear actuator means disposed in vertical alignment with said vessel and operatively connected to said piston to effect reciprocation of said piston in said cylinder;

a guiding conduit surrounding an open end of said cylinder generally above said arms, for guiding reciprocation of said cylinder with said arms and for transporting liquid from said arms; and an effluent outlet connected to said guiding conduit for carrying effluent liquid from said guiding conduit to a location remote from said vessel.

19. Apparatus as recited in claim 18 further comprising means for introducing liquid into the vessel for treatment of pulp passing therethrough, said means including a perforated jacket surrounding said guiding conduit and for introducing treatment liquid to flow radially outwardly from said guiding conduit.

* * * * *